United States Patent
McMeekin et al.

[15] 3,645,197
[45] Feb. 29, 1972

[54] SANDWICH-PREPARING MACHINES

[72] Inventors: James Stark McMeekin, Killearn; James Wilson Galloway, Glasgow, both of Scotland

[73] Assignee: Sandwiches (Glasgow) Limited, Glasgow, Scotland

[22] Filed: Dec. 31, 1969

[21] Appl. No.: 889,625

[52] U.S. Cl. ............................................. 99/450.4, 107/70
[51] Int. Cl. ........................................................ A23p 1/00
[58] Field of Search .......................... 107/1 F, 1 B, 1 J, 70

[56] References Cited

UNITED STATES PATENTS

| | | | |
|---|---|---|---|
| 546,662 | 9/1895 | Gage | 107/1 F |
| 1,816,536 | 7/1931 | Joachimson | 107/1 F |
| 1,830,425 | 11/1931 | Crosland | 107/1 F |
| 2,055,398 | 9/1936 | Alloo | 107/1 F |
| 2,851,003 | 9/1958 | Binsted et al. | 107/1 F X |
| 3,364,878 | 1/1968 | Kobori et al. | 107/1 F |

Primary Examiner—Price C. Faw, Jr.
Attorney—Young & Thompson

[57] ABSTRACT

A sandwich-preparing machine includes an endless conveyor system for passing at least one line of bread slices, and means for delivering the bread slices to said conveyor system. Spreading apparatus, for example a buttering machine, is located over the path of the line of bread slices and is adapted to spread viscous edible material on the bread slices. A sandwich-filling machine, for example a meat slicing and depositing machine, is provided, and at this machine the conveyor system is comprised by two parallel conveyor lines, the filling machine passing filling material onto the bread slices of one line. A side-by-side pair of receivers for the bread slices are located at the end of the conveyor system, and one receiver is pivotal to place its bread slice on the bread slice of the other receiver to form a sandwich.

27 Claims, 15 Drawing Figures

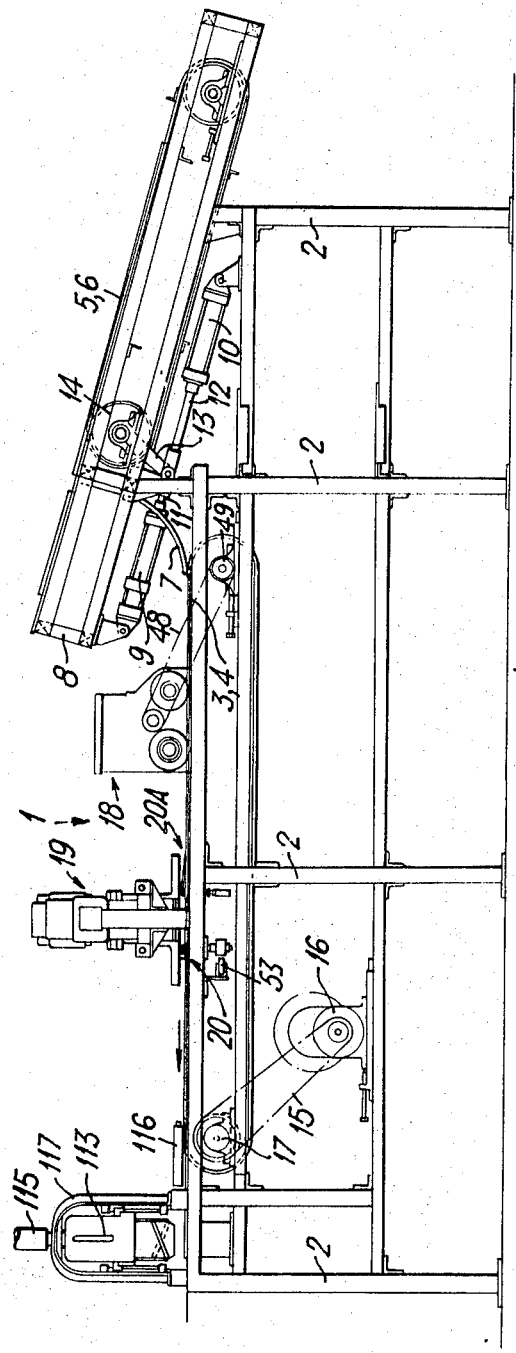

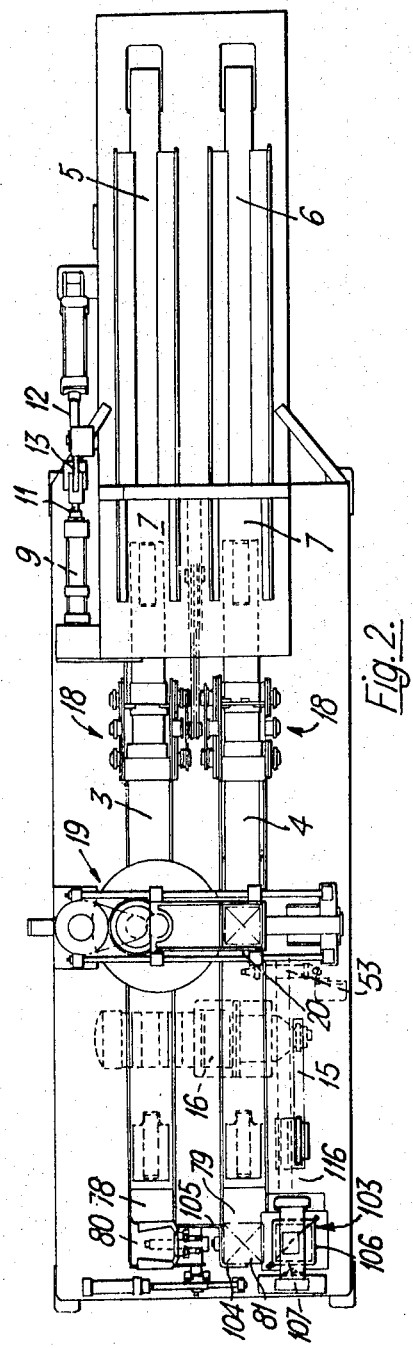

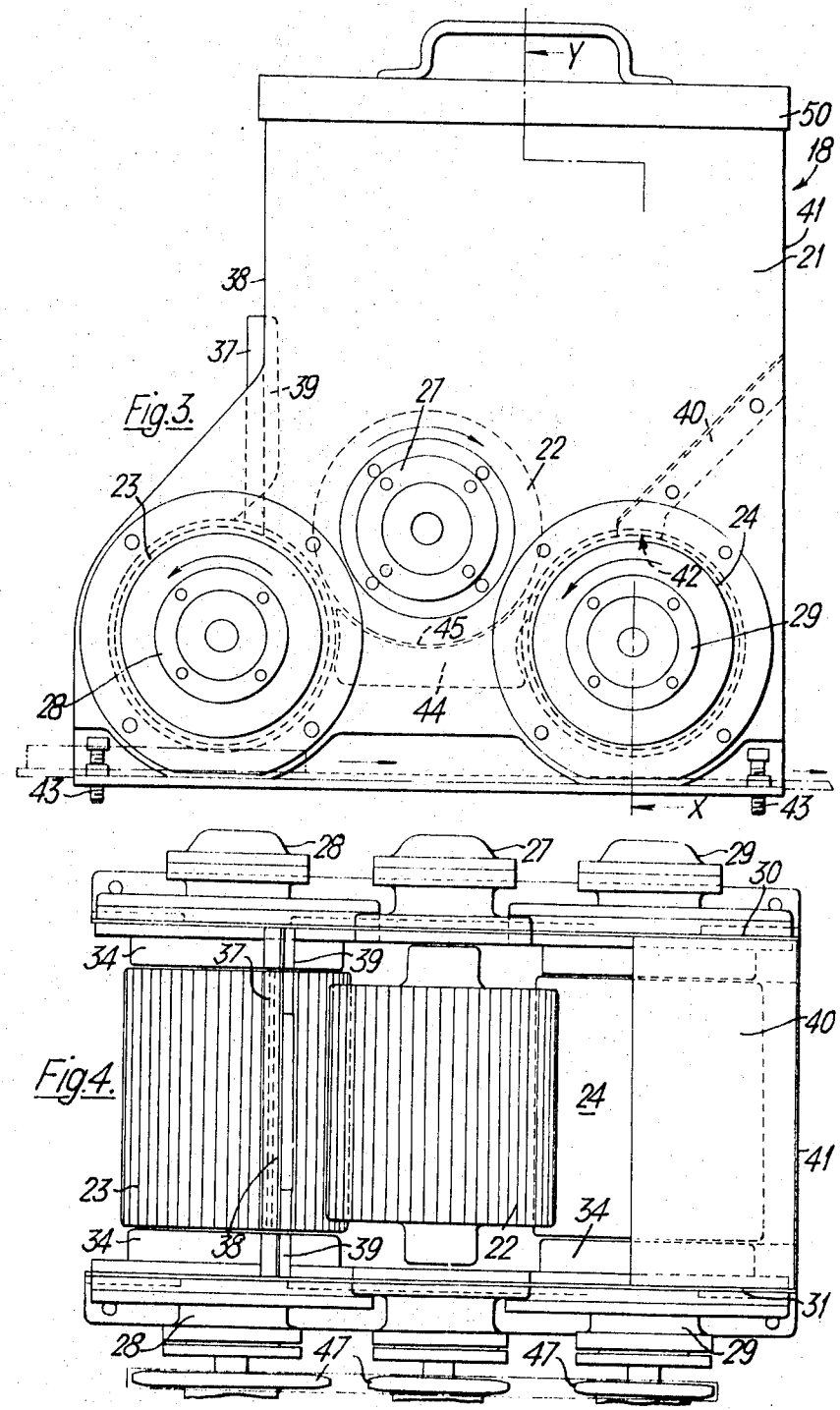

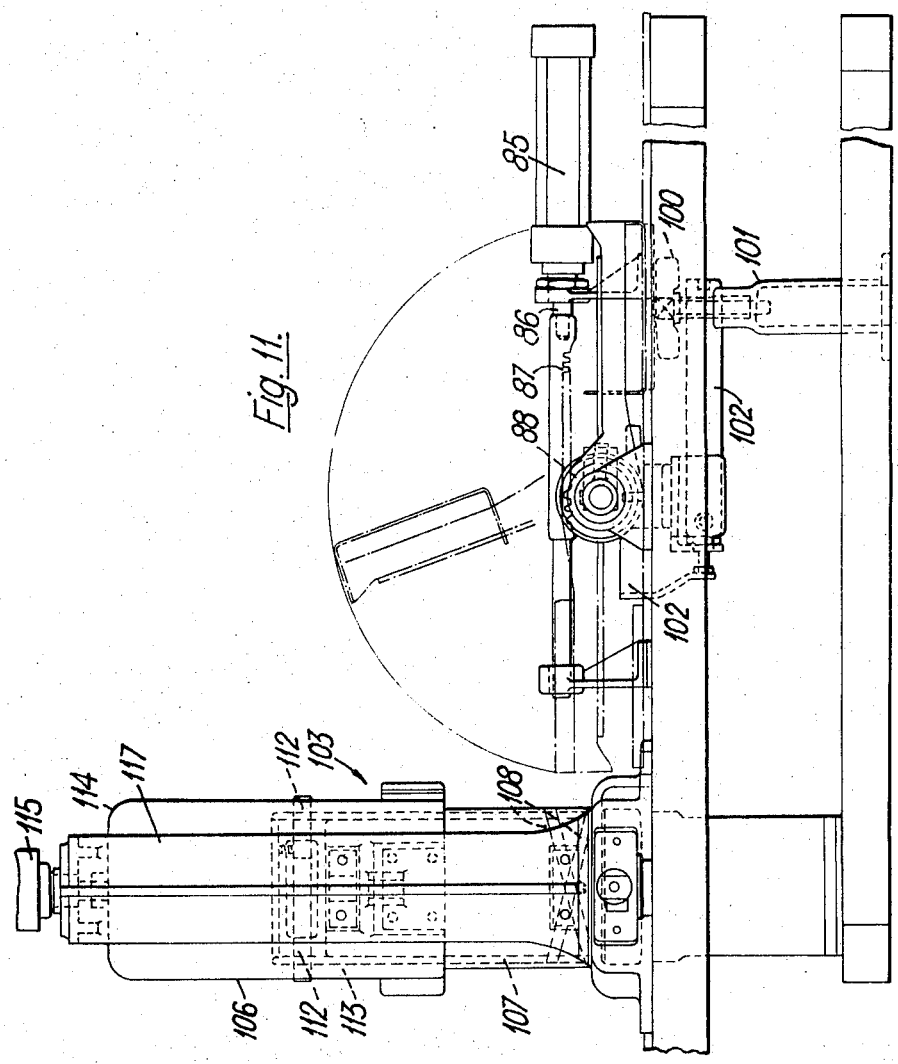

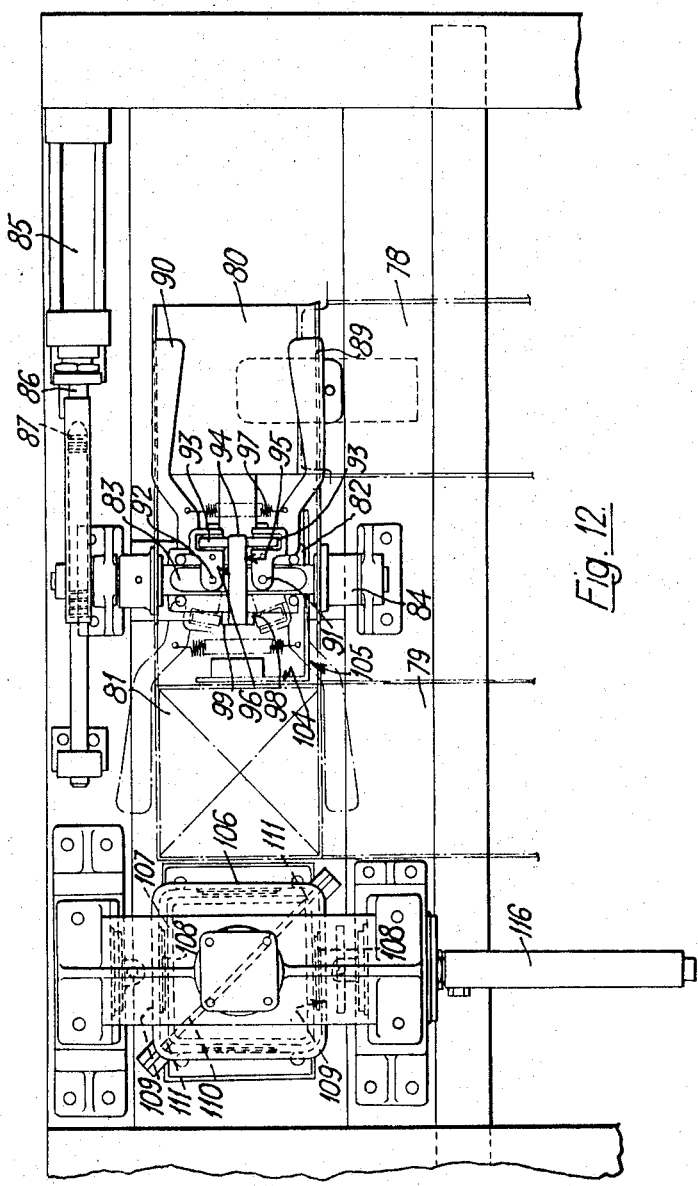

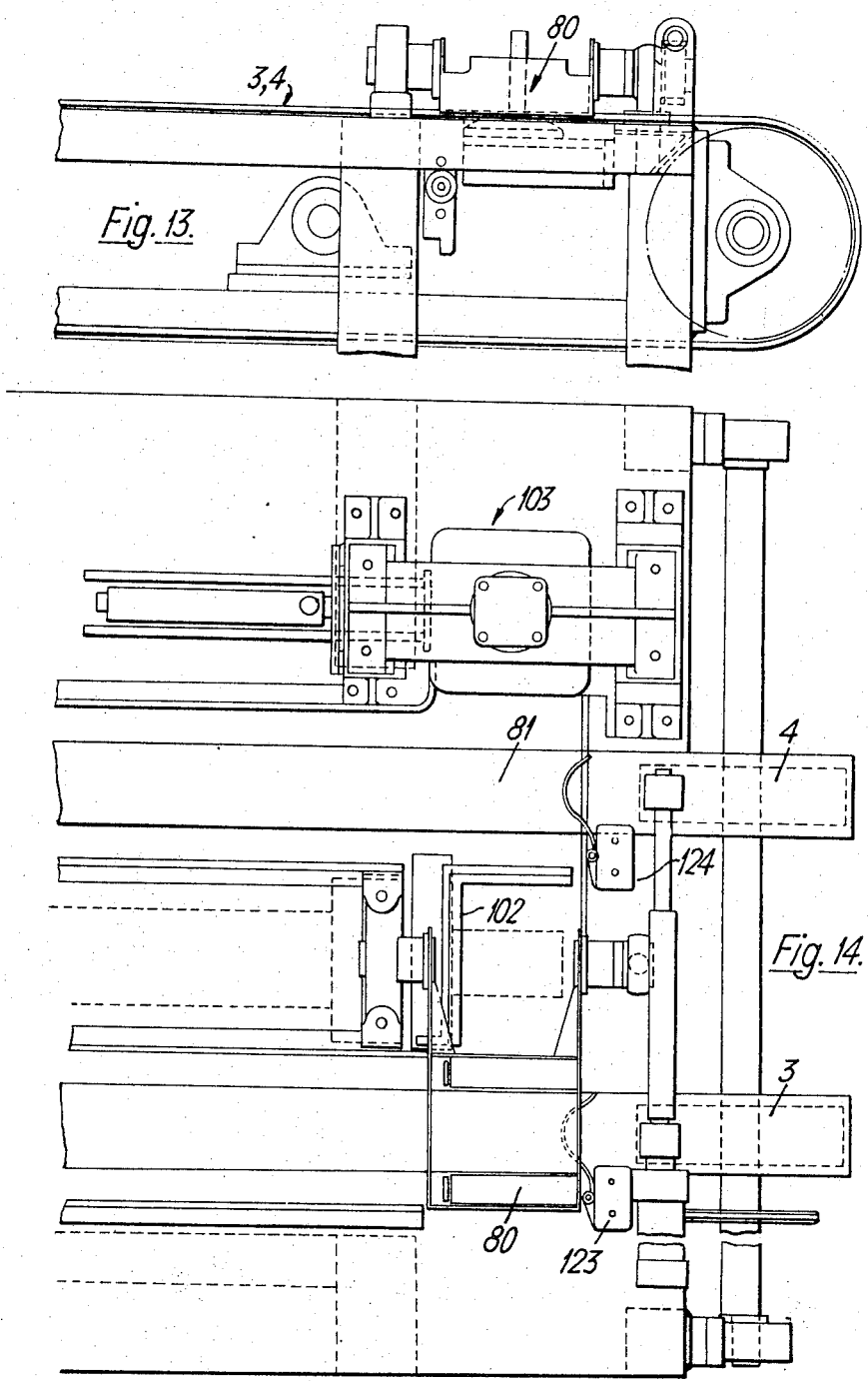

SANDWICH-PREPARING MACHINES

This invention relates to a sandwich-preparing machine.

According to the present invention a sandwich-preparing machine comprises an endless conveyor system for passing at least one line of bread slices, means for delivering the bread slices to said conveyor system, spreading apparatus located over the conveyor system in the path of the line of bread slices and adapted to spread viscous edible-material on the bread slices, means for applying sandwich-filling material, the conveyor system including two substantially parallel conveyor lines at the sandwich-filling means and the sandwich-filling means filling material to at least one of the lines of bread slices, and a side-by-side pair of bread slice receivers to which the endless conveyor system delivers the lines of bread slices, one of said receivers being pivotal to turn over each of the bread slices of one line and place the slice on top of a slice of the other line to make a sandwich.

Preferably the filling material is comprised by a solid edible-material and the means for applying the solid edible-material includes a cutting device for cutting layers from a block of the solid edible-material and adapted to deliver a layer onto each of the bread slices of the line.

Preferably the viscous edible-material is butter and the solid edible-material meat.

Preferably further, a trimming and severing device is provided which trims the edges of the prepared sandwich and cuts the sandwich into two, means being provided to deliver the prepared sandwich from its receiver to the trimming and severing device.

According to another aspect of the present invention, apparatus for spreading viscous edible-material onto a bread slice on a conveyor includes an open-bottomed container for the viscous edible-material mounted over the conveyor, a rotatable roller located in the container and the axis of the roller being parallel with the conveyor and at a predetermined height thereabove, means for rotating the roller in the direction of movement of the conveyor and such that the peripheral speed of the roller is approximately equal to the speed of the conveyor, and a blade element having a surface which, together with a peripheral portion of the roller surface, defines a slot of predetermined width, the arrangement being such that rotation of the roller causes the viscous material to be forced into the slot and a layer of the material skimmed from the slot onto the bread slice.

According to yet another aspect of the present invention, a layer cutting device for solid edible-material, in particular meat, includes a horizontally reciprocal frame, a first platform mounted on said frame for supporting a vertically disposed block of solid edible-material, a fixed vertical guideway for said block serving also for horizontal support of the block, cutting means supported on said frame and including a horizontally disposed cutting edge at a predetermined distance above the level of said first platform and adapted, on a forward movement of the frame, to cut a layer from said block, and a second horizontal platform supported by said frame and disposed behind said cutting edge at substantially the same level thereof and serving during cutting to support the block above the severed layer.

An embodiment of the present invention will now be described by way of example with reference to the accompanying drawings in which:

FIG. 1 shows a side view of a machine according to the present invention for preparing sandwiches;

FIG. 2 shows a plan view of the machine of FIG. 1;

FIG. 3 shows a front view of the butter-spreading device of the machine of FIG. 1;

FIG. 4 shows a plan view of the device of FIG. 3;

FIG. 11 is a front view of the slice receiver-and-inverting mechanism and guillotine device of the machine of FIG. 1;

FIG. 12 is a plan view of the mechanism and device of FIG. 11;

FIG. 13 shows a side view of a modification to the conveyor of FIG. 1;

FIG. 14 is a plan view of the modification of FIG. 13; and

Figure 5:
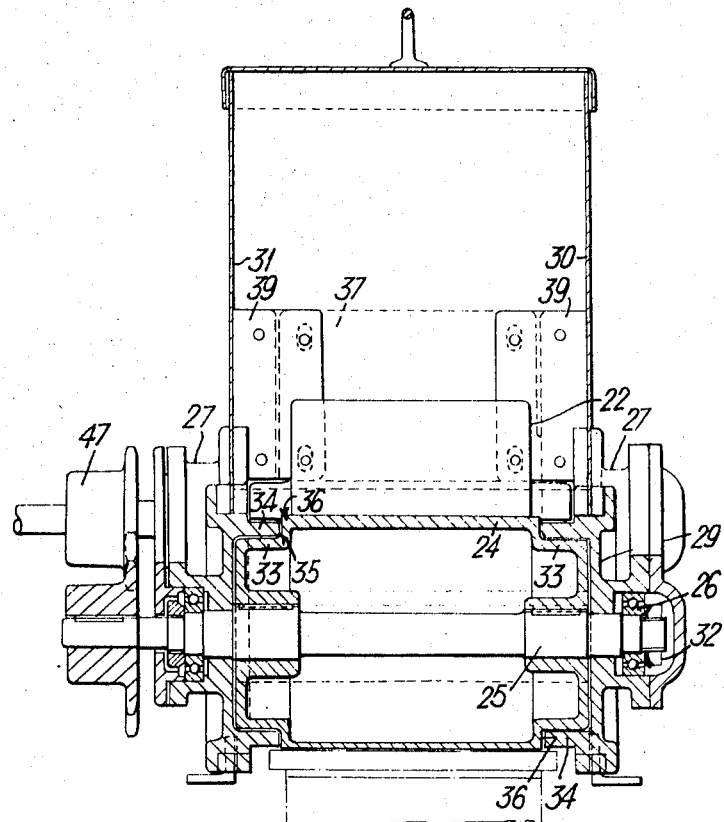
FIG. 5 shows a sectional side elevational view of the device of FIG. 3 through section X-Y in FIG. 3.

Referring to FIGS. 1 and 2, a machine 1 for preparing meat sandwiches includes a frame structure 2 supporting a main parallel pair of endless belt conveyors 3, 4 and a parallel but inclined pair of endless belt feed conveyors 5, 6 arranged before the main conveyors 3, 4 and slightly above the level thereof. An arcuate chute 7 joins the ends of the feed conveyors 5, 6 to the respective ends of the main conveyors 3, 4, and the feed conveyors 5, 6 are adapted to receive and move open-bottomed pallets (not shown) containing sliced loaves. A framed extension 8 is provided for the feed conveyors 5, 6 and is intended for receiving the empty pallets passing from the feed conveyors 5, 6. The feed conveyors 5, 6 are driven by a pair of opposed pneumatically operable piston-and-cylinder devices 9, 10 the respective rams 11, 12 of which are connected and actuate a crank 13 of one of the end rollers 14 of the feed conveyors 5, 6 to drive the roller 14 through a sprag clutch (not shown) and the main conveyors, 3, 4 are driven by belt drive 15 from an electric motor 16 through an end roller 17 of the conveyors 3, 4. It is arranged that the main conveyors 3, 4 speed is greater than that of the feed conveyors 5, 6, suitable speed values being 6 feet/meter and 3 inches/meter respectively. Arranged in sequence along the belt 4, of the main conveyor belts and disposed thereabove are a butter spreading device 18 and a meat-slicing machine 19 while only a butter-spreading device 18 is disposed above the other main belt conveyor 3. A bread-slice-indexing device 20 is provided for the main conveyor 4 at the meat-slicing machine 19 so that any operations can be carried out on the bread slice at that stage and associated therewith a slice arresting device 20A.

Each butter spreading device 18 (FIGS. 3-5) comprises a vertically disposed open ended casing 21 situated over a respective one of the conveyor belts 3, 4, the casing 21 being of rectangular cross section and mounted stationary on the frame structure 2. Three parallel rollers 22, 23, 24 are housed, or partially housed, at the bottom of the casing 21, and are arranged in triangular configuration with their axes arranged transverse of the main conveyors 3,4. Each roller 22, 23, 24 is keyed to a respective central spindle 25, and the outer projecting ends of each of the spindles are supported by ball-races 26 in endhousings 27, 28, 29 located in the end walls 30, 31 of the casing 21. The ball-races 26 cooperate with end collars 32 to prevent axial displacement of the spindles 25.

The two lower rollers 23, 24 have smaller diameter end portions 33, and an annulus 34 on each of the endhousings 28, 29 provides a socket for these end portions 33. It is arranged that only very small annular gaps exist between the portion 33 and the annulus 34, and between the lip 35 of the annulus and the shoulder 36 of the rollers 23, 24. Also, the end clearances between the rollers 23, 24 and the housings 28, 29 are very small.

The leading roller 23 of the lower rollers 23, 24 has its larger diameter peripheral portion serrated, and the periphery of the upper roller 22 is also serrated, the remaining roller 24 being plain. The axial length of the roller 22 is less than the axial length of of the larger diameter peripheral portions of the rollers 23, 24, this arrangement serving to mitigate against butter spreading axially on the rollers 23, 24 to the end gaps between the rollers and the annulus 34. The leading roller 23 project from the open bottom end of the casing 21, and a transverse scraper 37 on the casing end wall 38 controls the thickness of the butter layer on the roller 23. Additional end scrapers 39 are secured to the wall 38 and engage the outer ends of the roller and the annuluses 33 to prevent the flow of excess butter into the peripheral gap between the lip 35 and the shoulder 36. An inclined baffle plate 40 is located at the end wall 41 of the casing 21 and an end 42 of the plate 40 engages the periphery of the plain roller 24, the plate 40 assisting in funnelling of butter between the rollers 22, 24. The casing 21 straddles its respective conveyor 3, 4 whereby the lower rollers 23, 24 can engage a bread slice passing under the casing 21, and the casing 21 is adjustable vertically by means of screw adjusters 43.

The upper roller 22 is closely spaced from the lower rollers 23, 24, and an elongate block 44 extends between the lower rollers 23, 24 and below the upper roller 22. The block 44 forms narrow passages 45, 46 of predetermined width with peripheral portions of the rollers 22, 23, the end surfaces of the block 44 being profiled complimentarily to the roller peripheries, and the block 44 engages the roller 24. A sprocket 47 is secured to an end of the spindle 25 of each of the rollers 22, 23, 24, and the sprockets 47 a driven by a chain drive 48 (FIG. 1) from the conveyor end roller 49 such that the rollers 23, 24 are driven in a direction corresponding to the direction of movement of the main conveyors 3, 4, and the roller 22 is driven in a contradirection to rollers 23, 24. The drive ratio is chosen such that the speed of the rollers 23, 24 is slightly higher than the speed of the main conveyor 3, 4. A cover 50 is provided for the open top of each casing 21. The casing 21 and rollers 22, 23, 24 may be made of synthetic resinous plastics material.

Figure 10:
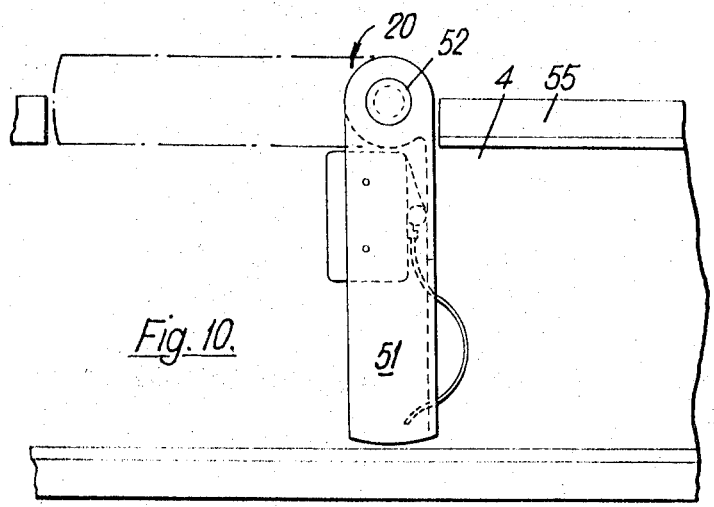
FIG. 10 is a plan view of the slice-indexing device of the machine of FIG. 1.

Down line from the buttering device 18 of the conveyor 4, the indexing device 20 is located and includes a radial arm 51 (FIG. 10) to arrest a bread slice moving on the conveyor. A spindle 52 (FIG. 10) subtending from an end of the arm 51 is rotatable by means of a pneumatically operable double acting piston-and-cylinder device 53 through a sprag clutch (not shown).

Figure 8:
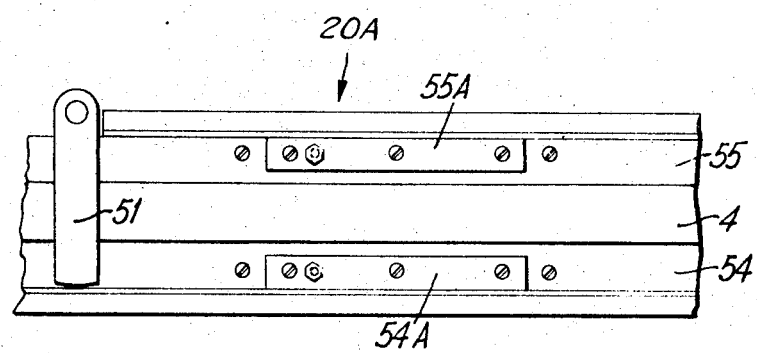
FIG. 8 is a plan view of the slice-arresting device of the machine of FIG. 1.
Figure 9:
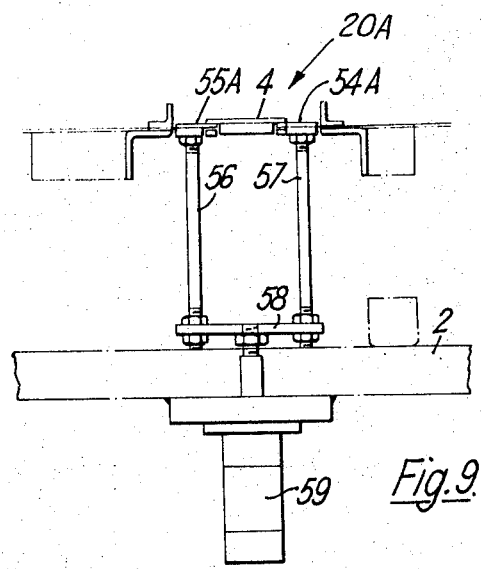
FIG. 9 is a side view of the device of FIG. 8.

The belts of each conveyor 3, 4 are flanked by stationary guide plates 54, 55, located slightly below the belt and the slice arresting device 20A (FIGS. 8, 9) is comprised by opposed portions 54A, 55A of these plates 54, 55 bore the indexing device 20, which are pivotal in a longitudinal plane to present a ramp to an oncoming bread slice whereby the slice is removed clear of the conveyor belt and consequently arrested. Pivoting of the portions 54A, 55A is effected by means of vertical actuating rods 56, 57 which are mounted on a plate 58 reciprocally driven by a pneumatically operable piston-and-cylinder device 59.

Figure 6:
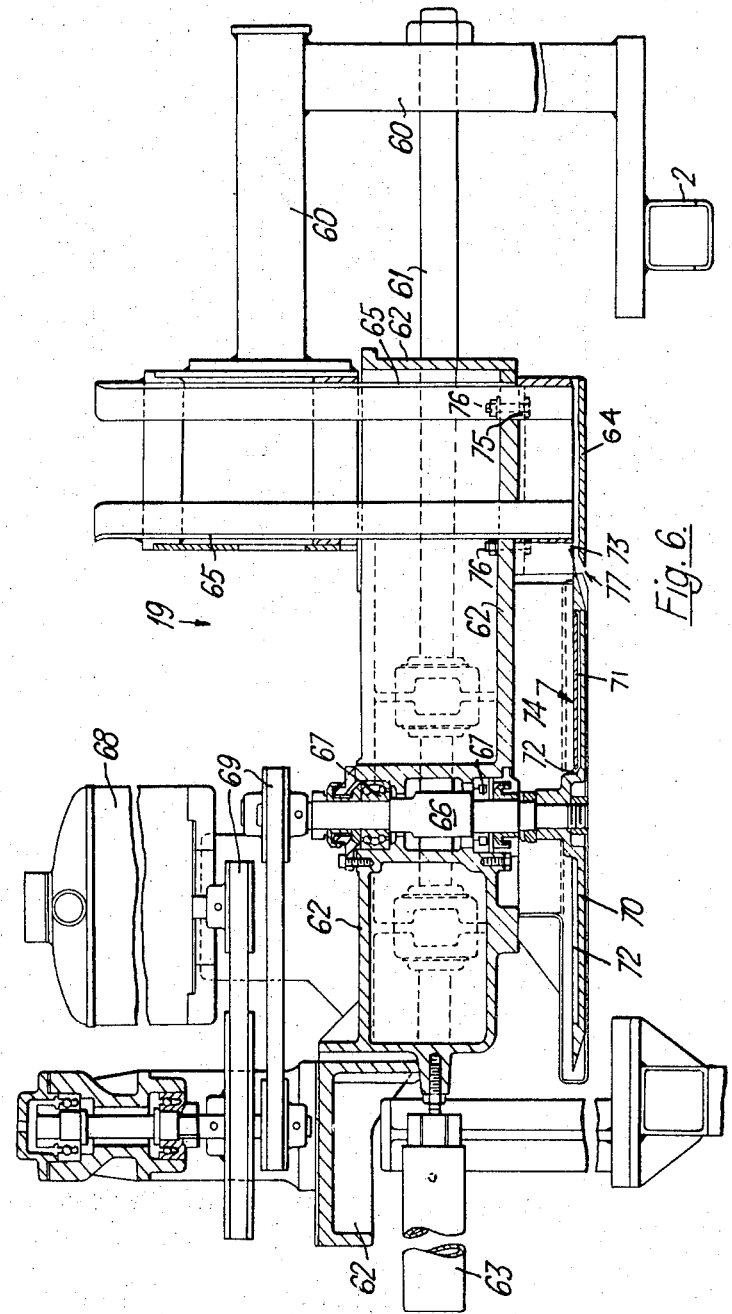
FIG. 6 is a sectional front view of the meat-slicing machine for the machine of FIG. 1.
Figure 7:
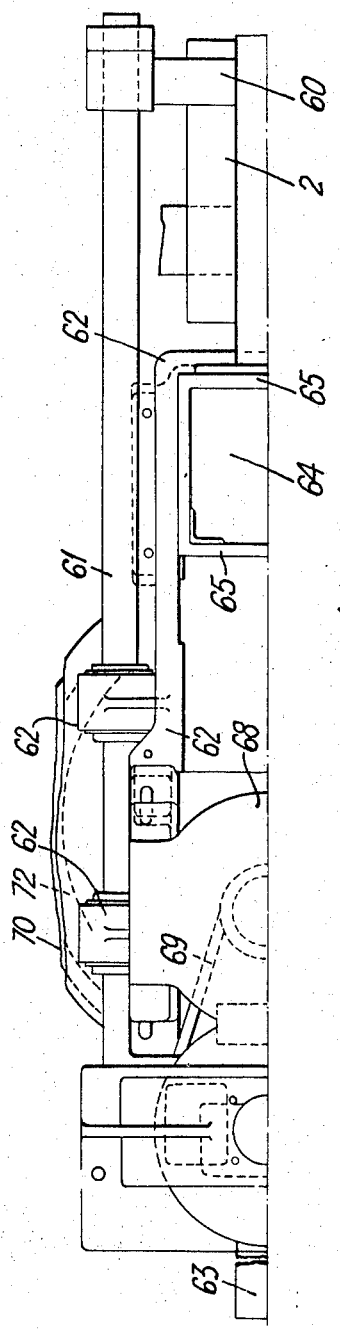
FIG. 7 is a partial plan view of the machine of FIG. 6.

The meat slicing machine 19 (FIGS. 6, 7) is positioned beside the indexing device 20 of the main conveyor line 4, and is supported by a stationary subframe 60 of the main frame structure 2. The subframe 60 includes a pair of horizontal guideways 61, and on these guideways 61 is slideably mounted a reciprocal frame 62. A fluid operable double acting piston-and-cylinder device 63 is connected to said reciprocal frame 62 to move same between two end positions. A first horizontal platform 64 bolted to said reciprocal frame is located slightly above the conveyor belt 4 and, in an inner end position of the reciprocal frame 62, serves to support a vertically disposed block of meat (not shown). Vertical guideways 65 which are arranged above the inner position of the platform 64 serve for horizontal support of the meat block.

A vertical rotatable shaft 66 is journaled in bearings 67 in the reciprocal frame 62, and the uppermost end of the shaft 66 is driven by an electric motor 68 through a belt drive 69. To the lower end of the shaft 66 is attached a circular cutting blade 70, the arrangement being such that the blade 70 lies on one side of the platform 64 with the peripheral cutting edge 73 of the blade 70 at a small predetermined distance thereabove, and such that, on advance of the reciprocal frame, the blade 70 can cut a slice from the vertical meat block. A second stationary horizontal platform 71, supported by the reciprocal frame 62, is housed in a recess 72 in the top surface of the blade 70 and has its upper surface 74 at the level of the cutting edge 73. This second platform 71 serves for support of the meat block above the severed slice. The level of the first platform 64 is adjustable by the insertion of shims 75 at the supporting bolts 76 thereof so that the thickness of the meat slice can be varied. The slicing machine 19 is so positioned relative to the indexing device 20 that the sliced meat is deposited on the bread slice arrested by the device 20, a gap 77 between the cutting edge 73 of the blade 70 and the adjacent edge of the first platform 64 allowing the severed meat slice to fall clear of the machine, 19.

The slicing machine 19 may be arranged to be pivoted in a vertical plane transverse to the conveyor means 3,4, whereby the machine 19 can be raised for the purpose of cleaning the blade 70 and other parts. With this pivotal arrangement, safety measures will be built into the machine 19 to ensure that the machine 19 only operates when it is in the lowered position: for example an on-off switch may be provided which is actuable by the pivoting of the machine 19 to stop the machine.

A pair of conveyor platforms 78, 79 serve for delivery of the bread slices from the main conveyors 3, 4 to a pair of side-by-side receivers 80, 81 (FIGS. 11 & 12) for the bread slices. The receiver 80 for the purely buttered slice from conveyor 3 is attached at one edge 82 to a shaft 83 parallel with the main conveyor 3, 4 axis, and the ends of this shaft 83 are journaled in trunnions 84, whereby the receiver 80 is pivotal to lie over the other receiver 81 and such that two bread slices can be brought together to form a sandwich. Pivoting of the receiver 80 is achieved by means of a pneumatically operable piston-and-cylinder device 85 (FIG. 11) the ram 86 of which carries a rack 87 engaging a pinion 88 on the shaft 83 for rotation of the shaft 83.

A pair of finger devices 89, 90 (FIG. 12) are provided over the first receiver 80 to maintain the bread slice in position during pivoting, and each is pivotally attached to a respective radial pin 91, 92 on the receiver shaft 83 so that each finger 89, 90 can pivot parallel to the surface of receiver 80. Each of the fingers 89, 90 carries a roller 93 which engages a respective side 95, 96 of a stationary upstanding cam plate 94, and a spring 97 connected between the fingers 89, 90 maintains the rollers 93 in contact with the cam plate 94. The cam plate 94 is arranged with projecting portions 98, 99 such that on pivoting of the first receiver 80 over the second 81, the fingers 89, 90 are pivoted apart to release the bread slice from the first receiver 80. A reciprocal arrester plate 100 is provided and operates by means of a spring operable piston-and-cylinder device 101, on pivoting of the first receiver; to prevent the delivery of slices from the conveyor table 78.

A pneumatically operable piston-and-cylinder ejection device 102 ejects the prepared sandwich to arrive below a trimming and severing device 103. The ejection device 102 includes a vertical plate 104 of Z-form and, on ejection of the sandwich, one wall 105 of the plate 104 prevents the delivery of further bread slices to the receiver 81. The cutting and severing device 103 (FIGS. 11 & 12) includes a pair of concentric tubular members 106, 107 of square cross section, the cross section of the outer member 106 corresponding to that of the bread slice to be cut. At the bottom of the outer member 106 (FIG. 11), a respective cutting blade 108 is attached to the inner face of each of the sidewalls 109, and a diagonal cutting blade 110 is provided thereat for cutting the sandwich in two. The inner member 107 is relatively massive, has recesses 111 to accommodate the cutting blade 110 of the outer member 106, and is located by pins 112 in an opposed pair of vertical slots 113 in the outer member 106. The outer member 106 has a top end wall 114 to which a pneumatically operable piston-and-cylinder device 115 is connected to effect vertical movement of the cutting device 103, the device 115 being mounted on a U-shaped support 117 which serves additionally for guiding the members 106, 107. Also, a further piston-cylinder device 116 is provided for ejection of the severed sandwich from the cutting device 103.

Figure 15:
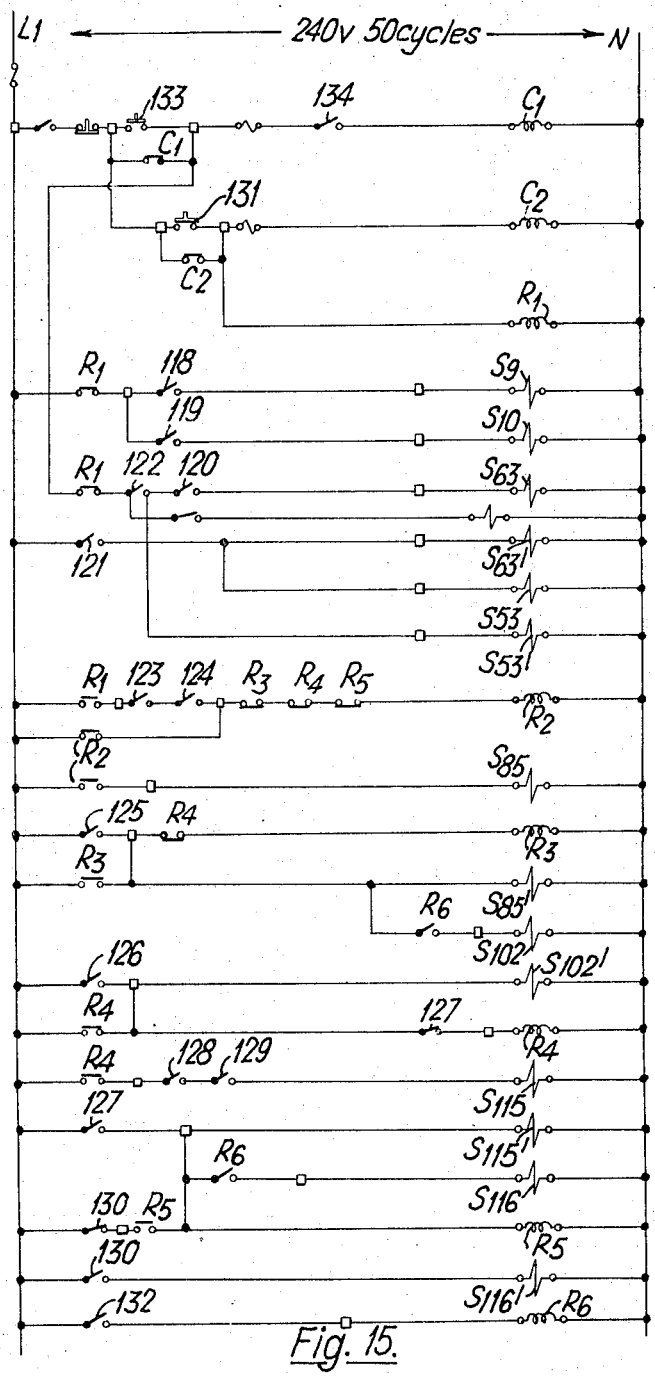
FIG. 15 is an electric circuit diagram for the machine of FIG. 1.

The various piston-and-cylinder devices are controlled by respective electric circuits, each circuit including a signalling device. Thus, referring to FIG. 15, a pair of microswitches 118, 119 are actuable by the rams 11, 12 of devices 9, 10 to actuate the devices such that reciprocatory movement is imparted to the rams 11, 12. A switch 120 is located at the indexing arm 51 and is operable by a bread slice to cause forward movement of the reciprocating frame 62 of the cutting device 19 and raising of the ramps 54A, 55A. Forward movement of the frame 62 triggers a switch 121 to pivot the arm 51, and to lower the ramps 54A, 55A thus permitting passage of the bread slice; and return of the frame 62 triggers a switch 122 to return the indexing arm 51. Microswitches 123 and 124 are located in the receivers 80, 81 respectively and are connected in series in the control circuit of the piston-cylinder device 85 so that the device 85 operates only when bread slices are present in both receivers 80, 81, the slices in the receivers actuating the switches 123, 124. A further switch 125 is actuated by the pivoting of receiver 80 to cause ejection of the double slice to the cutting device 103 and return of the pivoting receiver 80. Arrival of the double slice at the cutting device 103, triggers a further switch 126 to return the ejection device 102 to its initial position. When the ejection device 102 returns to its initial position, switches 128 and 129 are actuated and the cutting device 103 operates to trim the sandwich. The outer member 106, at its lowest position triggers a switch 127 causing the cutting device 103 to return to its initial upper position, and the piston-cylinder device 116 to eject the severed sandwich from the cutting device. Actuation of switch 130 by the device 116 causes return of the device, and return of cutter device 103 to its outer position triggers switch 132 to reset the apparatus. The various piston-cylinder devices are controlled by slide valves actuated by solenoids S, (the suffix denoting the piston-cylinder device) and the circuits include solenoid-relay switches $R_1$–$R_6$ for appropriate timed operation of the various circuits. A motor starter switch 131 is provided for the main conveyors 3, 4, and operates a contactor switch $C_2$; and a machine master switch 133 is provided and operates a contactor switch $C_1$. Also, FIG. 15 shows the safety switch 134 provided when a pivoting slicing machine 19 is used.

In operation of the sandwich making machine 1, the feed conveyor 5, 6 is driven continuously, and the vertically upstanding bread slices pass down the chutes 7 from the pallets to lie on one of their faces on the main conveyor belts 3, 4, the bread slices being spaced on the main conveyor 3, 4 due to the speed difference between the main and feed conveyors. The bread slices pass under the buttering devices 18 and the lower rollers 23, 24 of the device apply a layer of butter on the upper face of the bread slice. The butter within the casing 21 is forced into the passage 45 by the contrarotating rollers 22, 24, whence it is fed into the serrated roller 23, the scraper 39 controlling the thickness of the butter layer on the roller we. The roller 23 applies the butter to the bread slice in a somewhat ridged manner, and the purpose of the plain roller 24 is to smooth the butter layer. Down the line 4, each buttered slice is arrested by the indexing arm 51 and simultaneously the cutting device 19 is signalled to operate and the ramps 54A, 55A to raise to arrest the oncoming bread slice. The reciprocal frame 62 is moved forward and the rotating blade 70 cuts a slice of meat which is deposited on the bread slice of the line 4. Thereupon, the indexing arm 51 is signalled, and releases the bread slice, the reciprocal frame 62 returning to its inner position and the ramps 54A, 55A being lowered. The bread slices pass to their respective receivers 80, 81, and the first receiver 80, on receipt of a signal pivots to place the buttered slice on top of the bread slice having meat, a sandwich thereby being formed.

The sandwich is then moved under the trimming and cutting device 103. The tubular members 106, 107 of the device are caused to move downwards to engage the sandwich and the outer member 106 continues downwards to trim and sever the sandwich, the inner member 107 serving to steady the sandwich during cutting.

Modifications are of course possible in the above apparatus. Thus, referring to FIGS. 13, 14, the platforms 78, 79 could be dispensed with, and instead the main conveyors 3, 4 extended beyond the receivers 80, 81, whereby the bread slices are delivered to the receivers 80, 81 by the conveyors 3, 4.

Also, the two parallel main belt conveyors 3, 4 could be replaced by a system including a single endless conveyor to the slicing machine 19 and a pair of endless conveyors extending below the slicing machine to the receivers 80, 81, a tray oscillable transversely relative to the conveyors being provided to pass bread slices alternatively from the single conveyor to one and to the other of the parallel conveyors. Only a single buttering machine 18 would be required with this arrangement. Further, means may be provided in the gap between the socket and the small diameter portion 33 to mitigate against passage of butter along the gap. Such means may be for example ribs on the inner surface of the socket.

We claim:

1. A sandwich-preparing machine comprising an endless conveyor system for passing at least one line of bread slices, means for delivering the bread slices to said conveyor system, spreading apparatus located over the conveyor system in the path of the line of bread slices and adapted to spread viscous edible-material on the bread slices, the conveyor system including a pair of conveyor lines, a stationary first receiver receiving bread slices from one of said conveyor lines, a second receiver adjacent the first receiver and receiving bread slices from the other conveyor line and pivotal to place a bread slice therein on a bread slice in the first receiver, indicating means at each of the receivers producing a signal when bread slices are in the receivers, drive means for pivoting the second receiver and receiving signals from the indicating means whereby pivoting of the second receiver is effected only when bread slices are present in both receivers, and means for applying sandwich filling material to the bread slices passing on at least one of the conveyor lines.

2. A machine as claimed in claim 1, wherein the conveyor lines are arranged in parallel side-by-side relationship with the receivers arranged side-by-side, and the second receiver is pivoted along an axis parallel to the conveyor lines.

3. A machine as claimed in claim 1, wherein the filling material is comprised by a solid edible material and the means for applying the solid edible material includes a cutting device for cutting layers from a block of the solid edible material and adapted to deliver a layer onto each of the bread slices of the line.

4. A machine as claimed in claim 3, wherein the layer cutting device for solid edible material includes a horizontally reciprocal frame, a first platform mounted on said frame for supporting a vertically disposed block of solid edible material, a fixed vertical guideway for said block serving also for horizontal support of the block, cutting means supported on said frame and including a horizontally disposed cutting edge at a predetermined distance above the level of said first platform and adapted, on a forward movement of the frame, to cut a layer from said block, and a second horizontal platform supported by said frame and disposed behind said cutting edge at substantially the same level thereof and serving during cutting to support the block above the severed layer.

5. A machine as claimed in claim 4, wherein the cutting means include a circular blade, and a drive is provided for rotation of the circular blade.

6. A machine as claimed in claim 5, wherein an annular recess is provided in the upper surface of the blade, and the second platform is located in this recess.

7. A machine as claimed in claim 4, wherein the first platform is vertically adjustable for variation in the thickness of the layer of solid material cut.

8. A machine as claimed in claim 1, wherein the viscous edible material is butter and the solid edible material meat.

9. A machine as claimed in claim 1, wherein the drive means include a fluid operable piston-cylinder device.

10. A machine as claimed in claim 1, wherein retaining elements are provided over the pivotal second receiver to retain the bread slice on the receiver during pivoting thereof, the elements being movable apart to release the bread slice when the pivotal receiver is over the first receiver, and actuating means are provided to move the elements apart.

11. A machine as claimed in claim 10, wherein the actuating means comprise a stationary cam plate engaged by portions of the elements and arranged such that the elements are moved apart when the pivotal receiver is over the other receiver.

12. A machine as claimed in claim 1, wherein an arrester member is provided automatically movable to block the flow of slices to the pivotal second receiver on pivoting thereof.

13. A machine as claimed in claim 1, wherein a trimming and severing device is provided which trims the edges of the prepared sandwich and cuts the sandwich into two, means being provided to deliver the prepared sandwich from its receiver to the trimming and severing device.

14. A machine as claimed in claim 13, wherein the trimming and severing device includes a vertically reciprocal member having at the foot thereof spaced cutting blades for trimming of the bread slice and a further blade arranged diagonally relative to the spaced blades to cut the slice in two.

15. A machine as claimed in claim 14, wherein the reciprocal member is hollow, and an additional steadying member is located within the hollow member and operatively connected therewith such that, on descent of the hollow member to trim and cut a slice, the steadying member engages the slice prior to the hollow member whereby the slice is steadied for cutting.

16. A machine as claimed in claim 15, wherein the members are connected by a pin-and-slot arrangement.

17. A machine as claimed in claim 13, wherein a piston-cylinder device is provided for reciprocation of the members.

18. A machine as claimed in claim 1, wherein the apparatus for spreading viscous edible material includes an open-bottomed container for the viscous edible material mounted over the conveyor, a rotatable roller located in the container and the axis of the roller being parallel with the conveyor at a predetermined height thereabove, means for rotating the roller in the direction of movement of the conveyor and such that the peripheral speed of the roller is approximately equal to the speed of the conveyor, and a blade element having a surface which, together with a peripheral portion of the roller surface defines a slot of predetermined width, a second roller parallel to, but below and ahead of the first, the roller rotating means being such that the rollers rotate in contradirection, and the blade element has a surface which defines a slot of predetermined width with the second roller, the arrangement being such that rotation of the first roller causes viscous material to be forced into the slot and viscous material is skimmed from the slot between the blade element and the first roller onto the second roller, and the second roller feeds the viscous material onto a bread slice.

19. A machine as claimed in claim 18, wherein the first and second rollers have serrated peripheral surfaces.

20. A machine as claimed in claim 18, wherein a third plain-surfaced roller is provided parallel to and at the level of the second roller, the rotating means driving said third roller in the direction of the second roller, the third roller being located behind the first roller and serving to smooth the viscous material applied to the bread slice by the second roller.

21. A machine as claimed in claim 18, wherein a scraper element is provided extending parallel to the second roller and at a predetermined height above the peripheral surface thereof to control the layer thickness of the viscous material applied to the bread slice.

22. A machine as claimed in claim 18, wherein any one of the rollers is rotatably carried at each end by opposed walls of the container.

23. A machine as claimed in claim 22, wherein any of the rollers have small diameter end portions, and annular sockets projecting from the opposed walls hours these small diameter end portions.

24. A machine as claimed in claim 23, wherein an end scraper is located at each of the annular sockets and extends between the socket and the end part of the roller adjacent the socket, the end scraper contacting the socket and said end part of the roller.

25. A machine as claimed in claim 1, wherein the conveyor system includes two substantially parallel endless belt devices to provide two lines of bread slices, and respective spreading apparatus are located over both belt devices.

26. A machine as claimed in claim 1, wherein the conveyor system includes a single endless belt device to the sandwich filling means, two substantially parallel endless belt devices by the sandwich filling means to the slice receivers, and a feed device arranged to deliver bread slices from the single belt device alternately to one and to the other of the two substantially parallel belt devices, the spreading apparatus spreading material on the bread slices on the single belt device.

27. A machine as claimed in claim 1, wherein the means for delivering bread slices to the conveyor system includes at least one endless conveyor located before and above the leading end of the conveyor system, the endless conveyor being adapted to move open-bottomed containers of upstanding bread slices, delivery means extending between the discharge end of the endless conveyor and the leading end of the conveyor system to deliver the slices on their faces to the conveyor system, and an extension extending from the discharge end of the endless conveyor for receiving the containers.

* * * * *